(12) United States Patent
Konishi

(10) Patent No.: US 6,783,708 B2
(45) Date of Patent: Aug. 31, 2004

(54) METHOD AND DEVICE FOR PRODUCING SHORT FIBERS

(76) Inventor: Masao Konishi, 1301, Nishinodai 2-chome, Chita-shi, Aichi-ken (JP)

( * ) Notice: Subject to any disclaimer, the term of this patent is extended or adjusted under 35 U.S.C. 154(b) by 243 days.

(21) Appl. No.: 10/078,257

(22) Filed: Feb. 20, 2002

(65) Prior Publication Data

US 2003/0059491 A1 Mar. 27, 2003

(30) Foreign Application Priority Data

Sep. 25, 2001 (JP) .......................................... 2001-292115

(51) Int. Cl.[7] ................................................ B29B 9/10
(52) U.S. Cl. ................................................ 264/8; 425/8
(58) Field of Search ................................... 264/8; 425/8

(56) References Cited

U.S. PATENT DOCUMENTS

| 3,912,799 A | * | 10/1975 | Chisholm | 264/403 |
| 4,050,874 A | * | 9/1977 | Chisholm et al. | 425/382 R |
| 4,218,409 A | * | 8/1980 | Dannelly | 264/4 |
| 4,294,783 A | * | 10/1981 | Snowden | 264/8 |
| 5,171,489 A | * | 12/1992 | Hirao et al. | 264/8 |

* cited by examiner

Primary Examiner—Mary Lynn Theisen
(74) Attorney, Agent, or Firm—Arent Fox PLLC

(57) ABSTRACT

A short fiber producing device is composed of a rotor having a raw material receiving chamber having outlets disposed in the outer periphery, wherein the centrifugal force concomitant with the rotation of the rotor causes a fluidized body of plastic to be delivered from the outlets to provide short fibers; resin reservoir tanks are provided inside the outlets in the outer periphery of the raw material receiving chamber, so as to amplify the flow pressure produced by centrifugal force.

9 Claims, 5 Drawing Sheets

METHOD AND DEVICE FOR PRODUCING SHORT FIBERS

BACKGROUND OF THE INVENTION

1. Field of the Invention

The present invention relates to a method and device for producing short fibers by converting thermoplastics into short fibers through the use of centrifugal force.

The short fibers produced in accordance with the present invention are intended for use in forming fused molded products as set forth in applicant's prior application Ser. No. 09/331,199, hereby incorporated in its entirety by reference.

2. Prior Art

Conventionally, extrusion molding is generally used as a processing technique for obtaining fiber wool, and mechanical and forceful dispersion or fragmentation of plastic particles has been attained by a kneading screw built in an extruder or the like, obtaining fiber wool by eluting a plastic through a tip nozzle under the extrusion pressure of the screw. However, in the case where such melt spinning method is used to apply melt kneading to a variety of plastics which are in incompatible relationship, forceful shearing of dispersed particle and fragmentation of polymer are repeated by the screw, so that the polymer obtained by the kneading of incompatible polymers is a low polymer, which has failed to provide extensible fiber wool.

Japanese Patent Kokai Publication Sho 59-179811, Japanese Patent Kokai Publication Hei 6-322606, etc, propose fiberizing devices utilizing centrifugal force, but any of these devices is destined for fiberizing thermosetting resins, such as phenol resin. That is, such device is a fiberizing device for obtaining a catalytic reaction by rotating a phenol solution, with emphasis placed on catalytic reactions in solidification and cooling action after delivery.

Conventionally, the fiberization technique for obtaining fiber wool from thermoplastic has generally been extrusion spinning. Extrusion spinning comprises the steps of melting a plastic by a kneading screw built in a extruder in combination with heat radiation from the outside of the cylinder, and mechanically and forcefully extruding the plastic for melt-spinning through a delivery nozzle, thereby stably providing plastic fibers.

With such mechanical and forceful melt spinning method, however, when a variety of plastics consisting of composite raw materials or the like are simultaneously melted, this results in the built-in screw mechanically and forcefully applying dispersion or shearing, during which time individually polymers are subjected to repetitive fragmentation and mixing, so that the resulting plastic fiber is a plastic fiber composed of embrittled low polymers; it has been impossible to spin a plastic fiber which possesses extensibility and viscoelastic function, which are originally required and which are characteristic of high polymers.

As for centrifugal spinning devices, Japanese Patent Kokai Publication Sho 62-104908, Japanese Patent Kokai Publication Sho 62-17052, Japanese patent Kokai Publication 2000-50511, etc. disclose fiberizing devices which utilizes centrifugal force. However, any of the centrifugal spinning device is a rotational centrifugal spinning machine or the like additionally using glass or carbonaceous pitch fibers or an extruder, and any other disclosed centrifugal spinning devices are based on the precondition that the centrifugal device be fed after preprocessing is effected for molten or liquidized raw material; it has been impossible to feed crushed pieces of plastic or a composite raw material directly as a raw material. As a trial, a composite raw material was charged into an existing centrifugal spinning device, and the plastic was melted and gelled by the furnished heater or the like and then delivered for spinning plastic fibers; it was found that under the action of heat dissipation from the surrounding heat such as the heat from the heater installed in a rotational spinning dish, the polymers were subjected to the influence of heat history in the melting, shaping and solidifying processes, so that a phenomenon of deterioration such as carbonization or oxidation occurred. Therefore, the delivered plastic was spun into an embrittled fiber resembling a needle or bar, failing to attain the spinning of plastic fiber.

Along with development of new commodities, composition of plastic raw materials is under way and when these composited plastic products are once disposed of as waste, separation or classification of plastic raw materials become very difficult.

For example, in the case where a composite plastic consisting of 50:50 of crystalline plastic PP (polypropylene) and noncrystalline plastic PVC (polyvinyl chloride) is crushed and subjected as a trial to melt-spinning by a mechanical kneader (2-axis extruder), the individual polymers were repetitively dispersed and bonded by the screw built in the kneader, during which time the polymers of PP and the PVC react with each other, leading to a decrease in molecular weight, failing to provide a fiber wood which possesses extensibility. Therefore, perfect separation or classification to be attained as by finding a melt spinning method for PP alone after perfect separation of plastic have heretofore been considered to be the minimum processing condition for reclamation of waste plastic.

The inventor has found that pre-application of a process for a short fiber possessing extensibility is effective for reclamation of waste plastics, and on the basis of this finding, it is a technical problem to provide a short fiber wool possessing extensibility by conversion of individual plastics by applying a process to a variety of waste plastics in their mixed state without separation or classification even in the case of a waste of different kinds of plastics or composited plastic products of incompatible system.

Plastic wastes exist in a state in which varieties including PVC (polyvinyl chloride), PE (polyethylene), and PET (polyethylene terephthalate) are mixed. To proceed plastic recycle for these plastic wastes, according to the conventional recycle processing method, after plastic raw materials have once been identified, carefully selected raw materials alone are melted and then molded; thus, it has been considered difficult to process a variety of mixed plastic raw materials to provide recycled products possessing physical strength. With the conventional melt molding method, when it is desired to obtain a recycled article from PVC/PE mixed resin having PE, which is a different resin, incorporated therein with PVC used as a matrix, thermal strain, peeling, cracking or the like occurs in the PVC/PE interface; it has been quite impossible to obtain a product having values and physical strength.

The present invention is intended to provide a short fiber producing device wherein when melt molding is applied to a variety of mixed plastic raw materials for the purpose of effective utilization of resources, the polymer cohesive energy which is a cause of thermal strain, peeling or cracking occurring in recycled products is suppressed by melting the plastics in advance and finding molecular arrangement, thereby forming a single fiber composed of chained high polymer, and spinning plastic fibers possessing viscoelasticity and extensibility.

SUMMARY OF THE INVENTION

The invention provides short fiber production for obtaining plastic fibers possessing viscoelasticity and extensibility by using as a raw material a plastic composite raw material in the form of a mixture of a variety of kinds, such as PP (polypropylene), PE (polyethylene) and PET (polyethylene terephthalate). If the conventional melt spinning method, centrifugal spinning method or the like is used to try spinning on the basis of a composite material consisting of variety of kinds, the resulting plastic fibers are embrittled or deteriorated fibers resembling a needle or bar, failing to provide a plastic fiber possessing viscoelasticity and extensibility which are characteristic of plastic. The reasons and causes thereof have been investigated and the following main causes have been found.

(1) For a mixture of molten composite raw materials, when fragmentation and dispersion of polymer particles are simultaneously effected, the resulting plastic fiber changes into an embrittled fiber like a bar.

(2) If, for the melting process, an evolution from melting to shaping and then to solidifying is allowed to take a longer time than is necessary, the resulting plastic fiber changes into a fiber deteriorated like charcoal under the influence of heat history.

(3) Unless the cohesive energy of each polymer is suppressed for a melt mixture of composite raw materials, it is impossible to suppress the influence of thermal strain or phase separation on the mixture.

In the present invention, it has been found that quickly finding the molecular arrangement of each polymer from the raw material state of solids in the form of crushed plastic pieces, composite raw material or the like with respect to the cause of embrittlement or deterioration said to be due to plastic composite raw material and then effecting melt spinning makes it possible to spin a plastic fiber possessing viscoelasticity and extensibility.

Accordingly, the present invention is characterized by employing high frequency induction heating to accurately control and manage the melting temperature of plastic and additionally using centrifugal force concomitant with high speed rotation to quickly find the molecular arrangement of each polymer, thereby spinning a fiber possessing viscoelasticity.

In the present invention, the raw material receiving chamber for receiving a raw material is in the form of a rotor, and an inductor is disposed in the vicinity of the rotor. Passing a high frequency electric current through the inductor generates alternating magnetic flux in the rotor itself. On this occasion, by changing the resistance to and the frequency of the high frequency current flowing through the inductor, etc. the generation of Joule heat concomitant with the generation of the alternating magnetic flux is found from the surface of the rotor without contacting the latter, and the heating action of the rotor is locally obtained.

Unlike the outside heating action provided with heat dissipation from the outside, such as heater heat or hot wind disclosed in Japanese Patent Kokai Publication Sho 62-238807, Japanese Patent Kokai Publication Sho 62-104908, Japanese patent Kokai Publication 2000-50511, etc., this makes it possible to construct the rotor itself as a heat dissipation body. Generating alternating magnetic flux and applying heat generated by electromagnetic induction to a resin reservoir tank in the form of a local portion minimizes the influence of heat history. Quick spinning by centrifugal force concomitant with high speed rotation makes it possible to find the molecular arrangement of each polymer used as a composite raw material, thus making possible the melt spinning of a short plastic fiber possessing both extensibility and viscoelasticity at the same time.

According to an embodiment of the invention, a short fiber producing device comprises a rotor having a raw material receiving chamber having an outlet disposed in the outer periphery, it being arranged that the centrifugal force concomitant with the rotation of said rotor causes a fluidized body of plastic to be delivered from said outlet to provide short fibers, wherein a resin reservoir tank is provided inside said outlet. When melting and kneading are to be effected by crushing or by polymer dispersion in the conventional processing method, it has been impossible to treat the problem of polymer cohesive energy produced in the molded body. In the present invention, however, heated and melted plastic is fiberized by utilizing centrifugal force, whereby even for incompatible plastics in their mixed molten state, individual polymer molecular arrangements are found, so as to provide a short fiber of chained high polymer. Most of the plastic products which are wastes are composited plastic products made of incompatible plastic raw materials; thus, for recycling of plastics, melting of individual plastics must be effected in the mixed state of different kinds of these incompatible plastics, and attainment of this makes it necessary to secure an arrangement for a fiber possessing extensibility without involving a reaction between plastics which leads to lower molecular weight. To this end, rather than causing polymer dispersion and plastic particle breakage to occur as by mechanical kneading, a heat source is obtained in the outside to lead plastics in their high molecular state to a molten state, while subjecting the molten polymers themselves to a pressing force corresponding to the screw extrusion pressure by using centrifugal force concomitant with rotation of the rotor and change (increase) in flow pressure due to a resin reservoir tank, whereby a short fiber possessing extensibility can be obtained.

The cross sectional area of the resin reservoir tank may advantageously decrease as the outer diameter side of the rotor is approached. The decrease in cross sectional area means an increase in delivery pressure. For example, the resin reservoir tank may be a side wall positioned on the advance side as seen in the direction of rotation of the rotor and a side wall positioned on the delay side, and the side walls on the advance and delay sides form an angle therebetween. In this case, the side walls on the advance and delay sides may be symmetrical. Besides this, the side wall on the delay side may extend radially of the rotor and the side wall on the advance side forms an angle with respect to the side wall on the delay side. This arrangement ensures that the side wall on the delay side extending radially of the rotor acts as a pressure wall perpendicular to the direction of rotation, thus enhancing the pressure increasing effect. Further, in this case, since the side wall on the advance side is inclined with respect to the direction of rotation, it performs the role of introducing the molten plastic into the resin reservoir tank. The angle of inclination of the side wall on the advance side can be referred to as plastic inflow angle.

Thus, the cross sectional area or volume of the resin reservoir tank is sharply decreased by the plastic inflow angle while storing the molten plastic once in the resin reservoir tank, resulting in the plastic flow pressure being amplified. Additionally, concentrating the centrifugal action of the rotor on the outlet makes it possible to find the arrangement of molecules with respect to the direction of flow of the plastic and to obtain a fiber further possessing extensibility by means of centrifugal force.

The cross sectional area of the raw material receiving chamber may advantageously decrease as the outer diameter side of the rotor is approached. In other words, the cross sectional shape may narrow toward the front as seen in the direction of flow of raw material plastic. The shape narrowing toward the front may be in the form of a taper or a gradient. Such arrangement amplifies the pressure on the raw material plastic as the outer diameter side, or the outlet, of the rotor is approached.

A heating device may be provided adjacent the rotor. This heating device heats and melts the raw material plastic in the raw material receiving chamber. The plastic heated and melted not by mechanical kneading but by an outside heat source flows, in the form of chained high polymer, into the resin reservoir tank under the action of centrifugal force without polymer dispersion. The heating device is disposed on the upper surface and/or the lower surface of the rotor. As for the heating device, electric type, infrared type, heat medium type and other suitable type heaters may be employed selectively or in combination. High frequency heating may be employed.

A plurality of temperature regions may be provided radially of the rotor, the temperature in each region being adjustable. This ensures that different kinds of plastics fed into the raw material receiving chamber melt in separate positions according to their melting points.

The rotor may be composed of separable upper and lower halves. Such arrangement facilitates not only the processing of the outlet and resin reservoir tank but also cleaning, maintenance and inspection thereof. For example, provision of a groove of semicircular cross section in the mating surface of each of the upper and lower halves forms an outlet in the form of a hole of circular cross section when the two are put together. Alternatively, it is possible to interpose an outer peripheral ring between the upper and lower halves and provide a delivery port in the outer peripheral ring. A delivery metal gadget having a delivery port may be removably attached to the outer peripheral ring. Further, the inner wall of the delivery port may be shaped to have a concave or convex cross section to suppress the flow of plastic.

The upper half of the rotor may be centrally provided with a hollow cylindrical portion for feeding raw material. This makes continuous feeding of raw material possible. For example, inserting the discharge port of a loading hopper or, if a heater, dryer or any other pre-processing device is installed, the discharge port thereof into the hollow cylindrical portion, makes it possible to feed raw material without stopping the rotation of the rotor.

DESCRIPTION OF THE PREFERRED EMBODIMENTS

Figure 1:
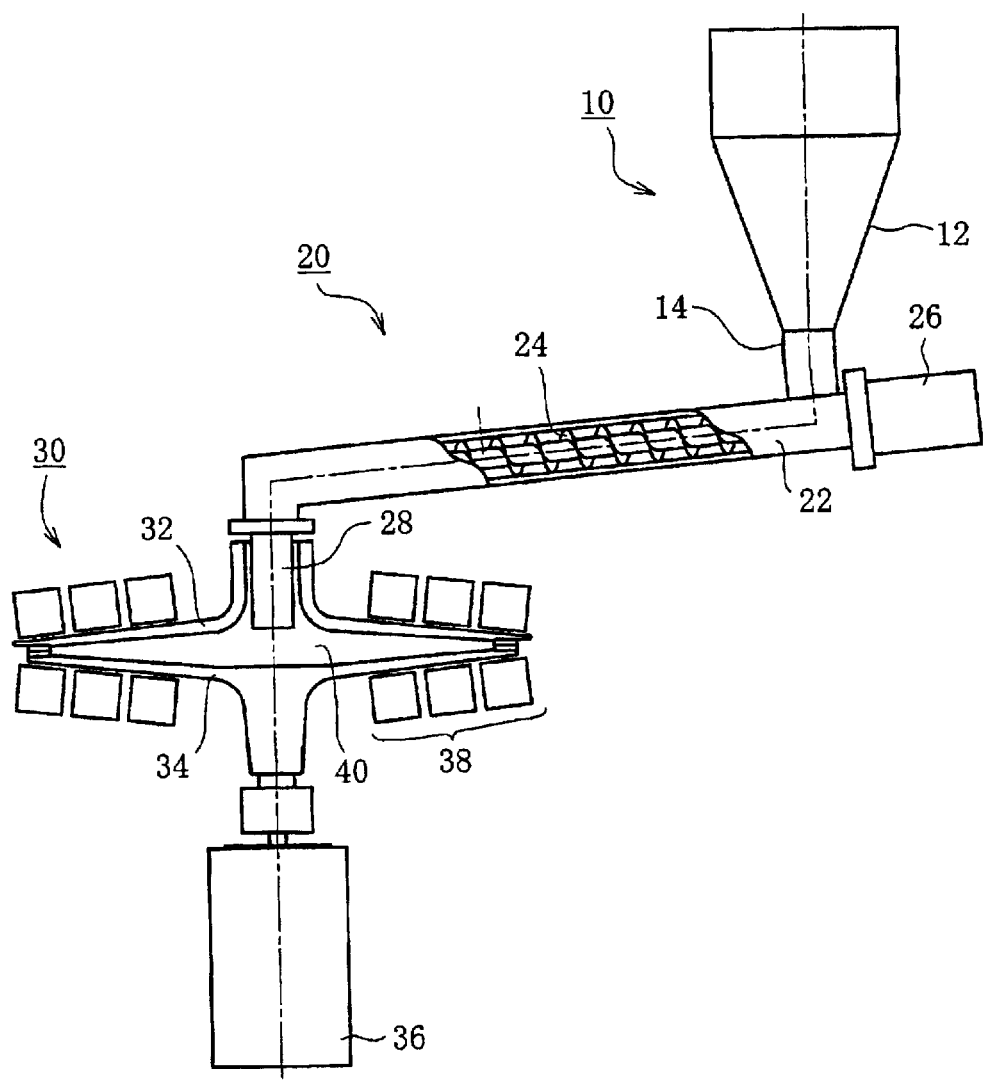
FIG. 1 is an elevation, partly in section, of a device, showing a embodiment of the invention.

In an embodiment shown in FIG. 1, a short fiber producing device comprises a raw material loading section 10, a pre-processing section 20, and a spinning section 30.

The raw material loading section 10 consists of a loading hopper 12, and a cylindrical delivery outlet port 14 formed in the lower portion of the loading hopper 12 is connected to the raw material feeding port of a screw mechanism constituting a pre-processing section 20.

The pre-processing section 20, in this case, is constituted by a screw mechanism, which receives a screw 24 in a casing 22, the screw 24 being adapted to be driven for rotation by a driving unit 26, such as an electric motor. The casing 22 is provided at its front end with a cylindrical discharge pipe 28.

The spinning section 30 comprises a rotor consisting of a pair of upper and lower halves 32 and 34, a driving unit 36 for driving the rotor (32,34) for rotation, and heating devices 38 disposed adjacent the rotor (32,34). In this case, the upper surface of the upper half 32 and the lower surface of the lower half 34 are respectively provided with the heating devices 38. Further, in the illustrated embodiment, a plurality, three in this case, of heat mediums 38a, 38b and 38c are disposed radially of the rotor (32,34) thus showing an example in which independent optional temperature setting is possible.

The upper and lower halves 32 and 34 constituting the rotor are separable. The upper half 32 is centrally formed with an upright hollow cylindrical portion 32a, in which the discharge pipe 28 of the screw mechanism is inserted. The lower half 34 is connected to the output shaft of a driving unit 36 through a coupling 34a. As for the driving unit 36, an electric motor may be cited as an example.

Figure 3:
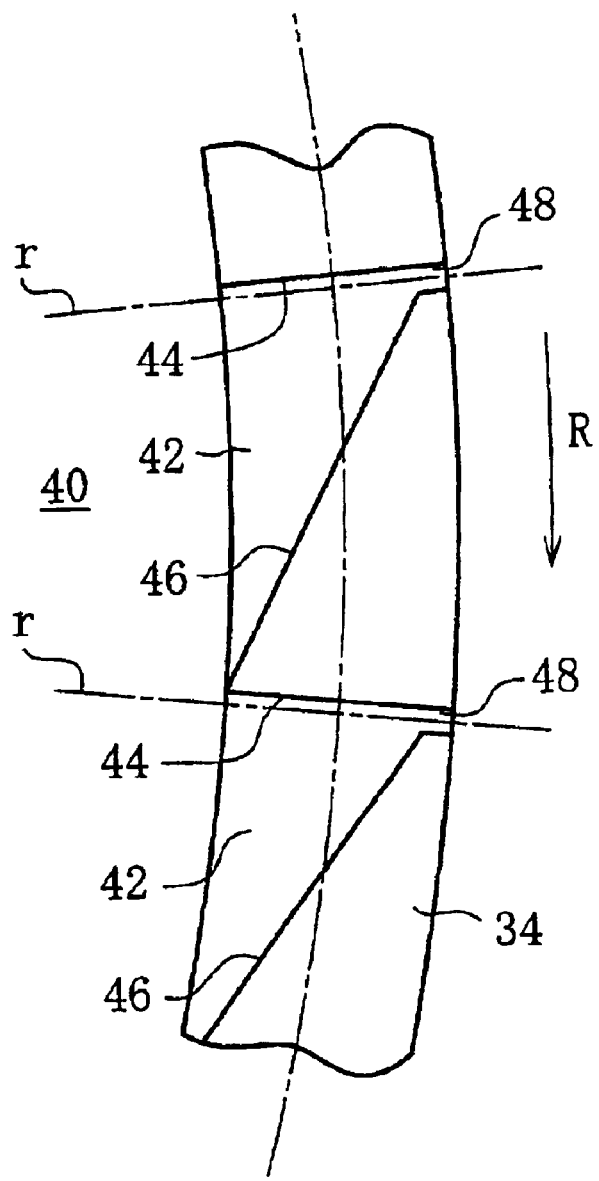
FIG. 3 is a view taken in the direction of arrow III in FIG. 2.

The upper and lower halves 32 and 33 define a raw material receiving chamber 40 therebetween, and the sectional shape of the receiving chamber 40 is taper- or wedge-shaped, as shown, the sectional area gradually decreasing as the outer diameter side is approached. The receiving chamber 40 is peripherally formed with resin reservoir tank 42. Each resin reservoir tank 42, as shown in FIG. 3, has a substantially triangular plane shape, surrounded with a radial side wall 44 extending radially of the rotor (32, 34) as indicated by the reference character r, and with an incline side wall 46 forming an angle with respect to the radial direction r. A radial outlet 48 is located in the top portion of the triangle of the resin reservoir tank 42.

Figure 2:
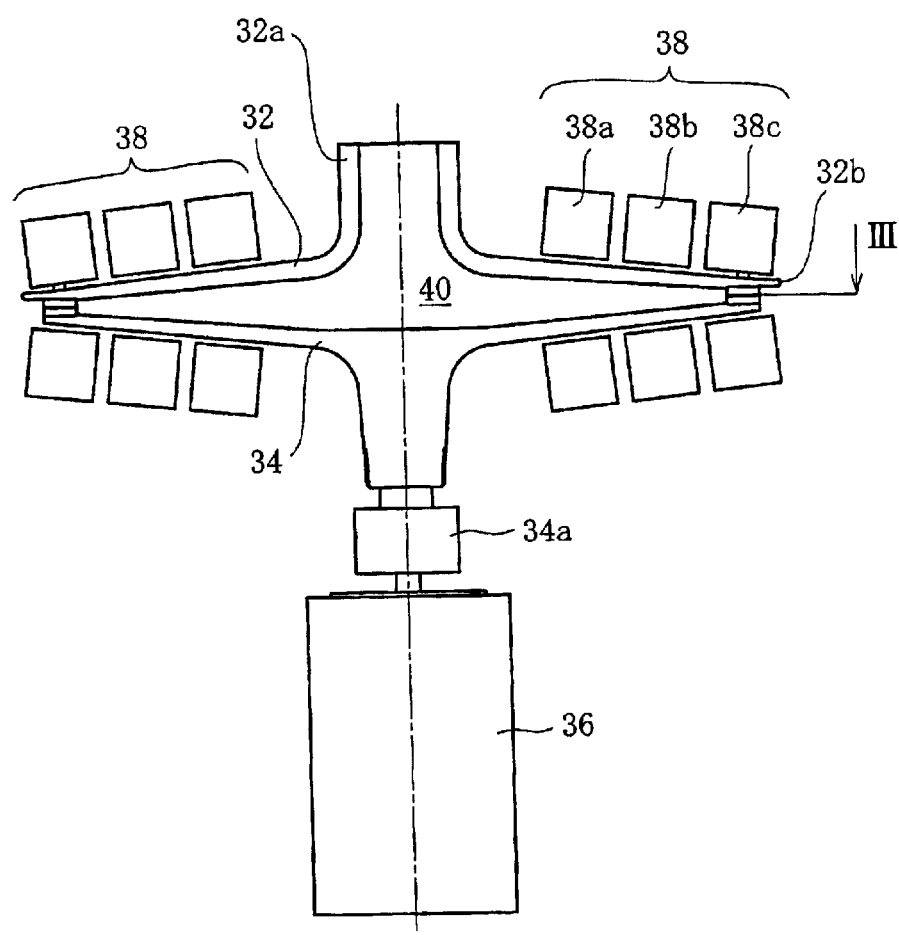
FIG. 2 is a partial enlarged view of the device of FIG. 1.

FIG. 3 shows a case in which the upper and lower halves 32 and 34 are each formed with a groove of semicircular cross section and the outlet 48 in the form of a fine hole of circular cross section is defined when the two 32 and 34 are put together, as shown in FIGS. 1 and 2. The outlet 48 may take the form of a groove as in the case of an open type where the rotor is composed of the lower half 34 alone. The outer peripheral surface of the upper half 32 is provided with an overhang portion 32b projecting above the outlet 48. This overhang portion 32b suppresses the soaring of short fibers being eluted from the outlets 48 and produces air currents in the vicinity of the outlets 48 to develop a cooling effect.

It is to be understood the rotor (32,34) rotates in the direction of arrow indicated by the reference character R in FIG. 3. Because of the shape described above, the sectional area of the resin reservoir tank 42 decreases as the outer diameter side of the rotor (32, 34) is approached. As is well known, the centrifugal force which is produced with the rotation of the rotor (32,34) is the greater, the longer the distance from the center of rotation. The molten plastic collecting in the resin reservoir tank 42 tends to flow out of the outlet 48 under the action of centrifugal force. On this occasion, since the sectional area of the resin reservoir tank 42 decreases as the outer diameter side of the rotor (32,34) is approached, the molten plastic rushes to the outlet 48.

Next, the processing method in the device will be described.

Crushed pieces of a variety of waste plastics are loaded as raw material plastic into the hopper 12 without separation or classification. For example, PP and PVC (50:50) are crushed into fragments about 3 mm square to 5 mm square and then loaded into the hopper 12.

Subsequently, these raw material plastics are introduced into the pre-processing section 20 through the discharge port 14 of the hopper 12. The water adhering to or mixed in the plastic pieces are removed during conveyance by the screw mechanism, while sufficient pre-heating adjustment is made in advance. For example, before being loaded into the rotor (32, 34), the raw material plastics are subjected to preparatory softening by being heated to about 60° C.–150° C.

Thereafter, they are fed from the discharge pipe 28 of the screw mechanism to the raw material receiving chamber 40 of the spinning section 30 via the cylindrical portion 32a of the upper half 32. At this time, the rotor is already rotating, and the plastic pieces dropped for loading into the raw material receiving chamber 40 are conveyed to the resin reservoir tanks 42 positioned on the outer periphery of the raw material receiving chamber 40 under the action of centrifugal force.

In the meantime, the plastic pieces are heated, melted or fluidized by the heat mediums 38a, 38b and 38c disposed above and below the rotor (32,34). The heat mediums 38a, 38b and 38c are arranged to provide temperature changes for example by creating low, medium and high temperature regions disposed in the order mentioned as seen from the inner to the outer peripheral side of the rotor, whereby the low-melting plastics become molten in the interior of the rotor, and the fluidized molten plastics flow to the resin reservoir tanks 42 under the action of centrifugal force. Similarly, reaching the high temperature region, the high-melting plastics become molten, and becoming fluidized they are once stored in the resin reservoir tanks 42.

The fluidized plastics are further increased in pressure by pressure walls installed in the resin reservoir tanks 42, thereby spouting out of the outlets 48. On this occasion, the individual plastics are fluidized and their molecular arrangement is regulated by centrifugal force concomitant with the rotation of the rotor (32,34); thus, short fiber wool possessing extensibility can be obtained. The plastics melted during high speed rotation can be given the extensibility function of plastic by the action of centrifugal force and the polymers can be given orientability by being eluted from the outlet 48 of small diameter. Further, cold wind is generated around the outlets 48 by the overhand portion 32b concomitantly with high speed rotation, whereby the polymers are cooled; therefore, the fibers can be given the extensibility function.

Figure 4:
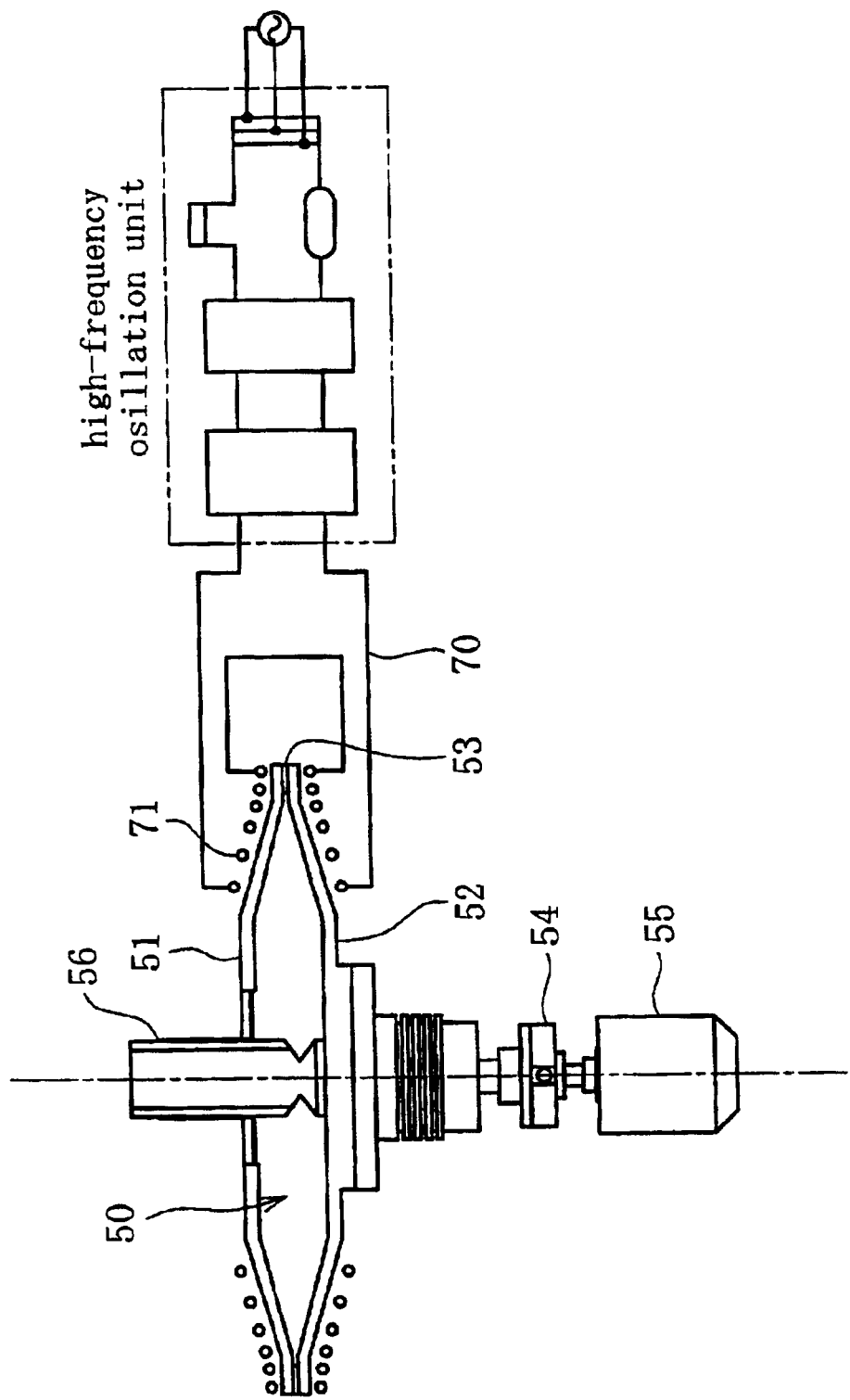
FIG. 4 is an elevation, partly in broken away, similar to FIG. 1, showing another working mode of the invention.

In the working mode shown in FIG. 4, a vertically separable, rotor (51,52) internally formed with a raw material receiving chamber 50 is connected to the output shaft of an electric motor 55 through a shaft coupling 54. The rotor (51,52) has a loading port 56 for loading raw material into the raw material receiving chamber 50. The loading port 56 is supported by an unillustrated stationary member and is unconnected with the rotor (51,52). The raw material loaded into the raw material receiving chamber 50 is moved to the outer periphery under the action of centrifugal force concomitant with rotation of the rotor (51,52)

Figure 5:
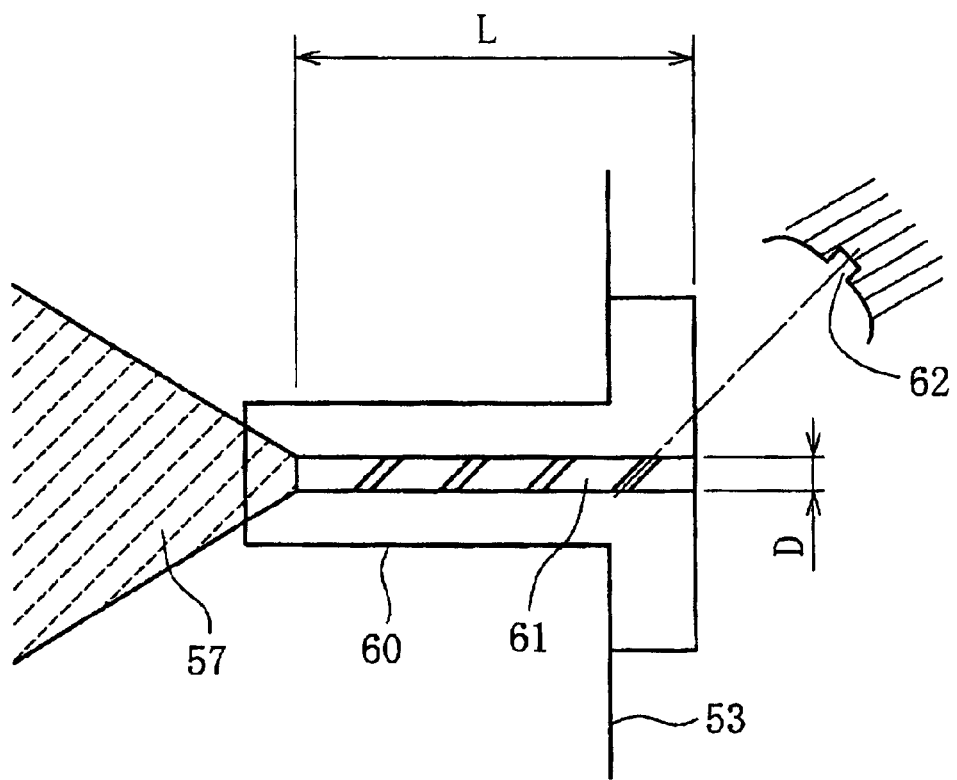
FIG. 5 is an enlarged sectional view showing a delivery port portion in FIG. 4.

The outer periphery of the raw material receiving chamber 50, as shown in FIG. 5, has a resin reservoir tank 57 defined therein. As shown, the resin reservoir tank 57 has its cross sectional area decreased as the outer diameter side of the rotor is approached. The front end of the resin reservoir tank 57 communicates with a delivery port 61. The delivery port 61 extends through a delivery metal gadget 60. The numeral 53 denotes a ring interposed between the upper and lower halves constituting the rotor (51,52). Delivery metal gadgets 60 are separably attached to the ring 53 at a plurality of circumferential places. The inner diameter of the delivery port 61 is indicated by D and the length by L. The inner peripheral wall surface of the delivery port 61 is formed with a spiral pressure resistant groove 62.

In this case, a high frequency heating device 70 (FIG. 4) is employed as a heating device. An inductor (coil) 71 is installed in the raw material receiving chamber 50, in particular, the region adjacent the resin reservoir tanks 57 in the periphery of the rotor for passing a high frequency current.

The finely crushed plastic pieces are fed from the raw material loading port 56. In this case, it is not particularly required to rigorously determine the size of crushed pieces; composited plastic pieces are crushed to about 3 mm–10 mm and fed from the loading port 56. As already described, the loading port 56 is unconnected with the rotor (51,52), so that the loaded plastic pieces drop into the raw material receiving chamber 50 without being subjected to the action of centrifugal force. The crushed pieces dropped into the raw material receiving chamber flow into the resin reservoir tanks 57 disposed in the outer periphery by the centrifugal force of the rotor rotating at 500–2000 rpm, and they are once stored in the resin reservoir tanks. The inductor 71 for passing high frequency current is installed above and below the rotary plate in the vicinity of the resin reservoir tanks 57, so that when it is fed with a high frequency current having a frequency of 30 KHz–300 MHz and a high frequency output of 0.5 Kw–100 Kw, electromagnetic induction concomitant with alternating magnetic flux occurs in the surface of the rotor. On the surface of the heated material where the electromagnetic induction occurs, the current density increases and conversion of electric energy into heat energy results in heat being generated from the surfaces of the resin reservoir tanks 57 in which the magnetic field concentrates; thus, stabilized plastic melting becomes possible. In an external heating method using heat mediums such as heater heat and hot wind, it is difficult to inhibit the distribution of temperature rise from spreading in a wide range and to inhibit heat dissipation due to air friction caused by the rotary plate rotating at high speed; therefore, the method is not suitable for melting conditions which strictly determine the setting of a series of temperature conditions, such as melting, shaping and solidifying. The employment of high frequency heating makes it possible to locally heat the resin reservoir tanks from their inner surfaces.

Feeding a high frequency current to the inductor 71 results in the resin reservoir tanks being internally locally heated and the plastics are melted. In the resin reservoir tanks, the plastics are always pressed in their compacted state by the action of centrifugal force. Therefore, the plastics melted by the local inductive heating phenomena are gelled and then flow into the delivery ports 61 by the action of centrifugal force without changing to deterioration or oxidation.

The gelled plastics melt and come out of the delivery ports 61 and are further stretched by air friction concomitant with high speed rotation for molecular arrangements of the respective polymers, thus making it possible to spin plastic fibers peculiar to high polymers, possessing elasticity and extensibility. However, trying concurrent melting and delivering a variety of high polymers encounters difficulty in obtaining a new polymer bond within the rotor. As a result, the polymers to be delivered are delivered as short fibers in a fixed amount, yielding to the centrifugal force and air friction resistance concomitant with rotation, slipping off the delivery ports 61. Accordingly, with such short fiber delivery conditions taken into account, countermeasures are taken by securing a sufficient side wall surface for the inner wall surface of the delivery port and providing a concavo-convex type pressure resistant groove 62 in the inner wall surface of the delivery port, thereby providing the delivery port with a flow withstanding pressure surface sufficient to counteract the centrifugal force concomitant with the high speed rotation and the air friction resistance of the fibers being delivered and stretched; thus, the flow state of the melt is stably controlled.

The plastics melted by high frequency heating are pressed against the outer peripheral wall by the action of centrifugal force. The resin reservoir tank 57 gradually decreases in cross sectional area as the outer diameter side of the rotor is approached. Therefore, the volume of the resin reservoir tank gradually decreases as the outer diameter side is approached. A combination of the pressure increasing action due to this volumetric change of the resin reservoir tank and the action of centrifugal force causes the molten plastics to flow toward the delivery port.

Further, plastic has very high viscoelasticity as a high polymer melt, and when short fibers are spun with a composite raw material used as a base, contrary to the conventional centrifugal spinning device, a flow pressure sufficient to counteract the centrifugal force of the rotary plate and air friction resistance to the fibers to be stretched is obtained in the delivery port. Accordingly, the delivery port 61 is formed in the delivery metal gadget 60 made of special material separate from the rotor (51,52) so as to secure a flow withstanding pressure surface capable of counteracting the friction resistance concomitant with the delivery or spinning of plastic fibers having high viscoelasticity, and the pressure resistant groove 62 is provided, thereby giving the delivery port the flow withstanding pressure sufficient to withstand centrifugal spinning. Since it is also necessary to take measures according to the shearing viscosity dependent on raw material, the delivery metal gadgets 60 are of separate construction to provide for exchange.

The delivery port in the conventional centrifugal spinning device is designed to deliver a liquid or molten material in large quantities by forming a number of holes in the outer peripheral side wall surface of the rotary plate. For example, according to Japanese Patent Kokai publication Sho 57-154416, it is stated that the melt viscosity is within 10–100 poise and spinning is effected by delivering the melt together with a gas at temperatures 280–400° C., thus disclosing a method for increasing the amount of delivery by combining fluidity with respect to the delivery port with a low viscosity high-temperature heat medium; the delivery port does not have a function to increase or suppress the fluidity.

Specifically, the construction of the delivery port corresponding to delivery conditions for a composite raw material containing PP (polypropylene) and PVC (polyvinyl chloride) is as exemplified in Table 1.

TABLE 1

| CONSTRUCTION OF DELIVERY PORT (Unit: mm) | |
| --- | --- |
| Delivery port diameter D | φ0.1–φ3.0 |

TABLE 1-continued

| CONSTRUCTION OF DELIVERY PORT (Unit: mm) | |
| --- | --- |
| Delivery port length L | D × 10–100 |
| Pressure resistant groove diameter | D × 1/4–6/2 |

Further, various conditions including rpm and high frequency heating are to be suitably adjusted according to raw material conditions.

As a concrete example, composite raw material consisting of PP (polypropylene) having specific gravity of 0.95 and PVC (polyvinyl chloride) having a specific gravity of 1.20 was finely crushed to about 3–10 mm and fed into the material receiving chamber rotating at high speed, the rotational speed of the rotary plate being 600 rpm, and concurrently, high frequency waves were fed to provide a frequency of 150 MHz, an output of 5 Kw and a within-groove temperature of 180–190° C., so as to try centrifugal spinning. As a result, where were obtained plastic short fibers having a fiber diameter of 0.1–0.3 mm, a tensile yield stress of 20–30 Mpa, and an elongation at break of 300–650%. The details are as shown in Table 2.

TABLE 2

| REPORT OF EXPERIMENT EVALUATION | | | |
| --- | --- | --- | --- |
| Raw material | Name | | Secific gravity |
| | PP (polypropylene) | | 0.92–0.97 |
| | PVC (polyvinyl chloride) | | 1.15–1.25 |
| Rpm | 600 | Amount of delivery | 300 Kg/H |
| High frequency output | 75 Kw | Frequency | 10 KHz |
| Delivery port diameter | φ0.5 mm | Side wall length | 40 mm |
| Pressure resistant groove | 0.3 × 0.3 × 5 mm | Crushed pieces | 3–10 mm |
| Delivery pressure (MPa) | 30–65 | Elastic modulus in tension (GPa) | 1.8–5.2 |
| Volume of resin reservoir tank | 35–70 cm³/□ | Within-groove temperature | 180–190° C. |
| Fiber diameter | 0.1–0.3 mm | Fiber length | 100–600 mm |

Most of the plastic wastes hardly lend themselves to separation or classification of raw materials for recycling, with the result that disposal has resorted simply to burning or landfill, thus obstructing the effective use of resources. According to the present invention, however, a variety of plastic wastes can be processed for recycling to provide short fibers without resorting to separation or classification; thus, plastic wastes can be converted into raw material for use as effective recycled material, making it possible to open up a new market for recycled products.

What is claimed is:

1. A short fiber producing device comprising a rotor having a raw material receiving chamber having an outlet disposed in the outer periphery, wherein a centrifugal force concomitant with the rotation of said rotor causes a fluidized body of plastic to be delivered from said outlet to provide short fibers, wherein a resin reservoir tank is provided inside said outlet and wherein a heating device is provided adjacent said rotor.

2. A short fiber producing device as set forth in claim 1, wherein a plurality of temperature regions are provided radially of said rotor, the temperature in each region being adjustable.

3. A short fiber producing device comprising a rotor having a raw material receiving chamber having an outlet disposed in the outer periphery, wherein a centrifugal force concomitant with the rotation of said rotor causes a fluidized body of plastic to be delivered from said outlet to provide short fibers, wherein a resin reservoir tank is provided inside said outlet, and wherein said rotor is composed of separable upper and lower halves.

4. A short fiber producing device as set forth in claim 3, wherein said upper half is centrally provided with a hollow cylindrical portion for feeding raw material.

5. A short fiber producing device as set forth in claim 1, wherein said heating device is a high frequency induction heating device.

6. A short fiber producing device as set forth in claim 5, further comprising an inductor disposed adjacent the raw material receiving chamber for generating induction heat, wherein the plastic melts and flows under the action of high frequency heating and then is delivered by the centrifugal force of the rotor to provide short fibers.

7. A short fiber producing device comprising a rotatable raw material receiving chamber with a resin reservoir tank for melting plastic in an inner wall surface thereof, and a high frequency induction heating device for inducing a local heating action in the chamber.

8. A short fiber producing device as set forth in claim 7, wherein a plastic delivery port in the form of hole or groove is formed in a wall of the raw material receiving chamber and has a raised or recessed portion for suppressing the flow of plastic.

9. A short fiber producing method comprising the steps of feeding crushed pieces of plastic or pellet-like solid substance directly into the raw material receiving chamber in the interior of a rotor, gelling the plastic in the raw material receiving chamber by high frequency induction heating, and delivering the gelled plastic by the action of centrifugal force concomitant with the rotation of the rotor so as to provide short fibers.

* * * * *